United States Patent
Hopkins et al.

(10) Patent No.: US 8,116,595 B2
(45) Date of Patent: Feb. 14, 2012

(54) UNIVERSAL INTERFACE FOR MEDICAL IMAGING RECEPTORS

(75) Inventors: Richard Hopkins, Temecula, CA (US); Oscar Khutoryansky, Baldwinsville, NY (US)

(73) Assignee: Infimed, Inc., Liverpool, NY (US)

( * ) Notice: Subject to any disclaimer, the term of this patent is extended or adjusted under 35 U.S.C. 154(b) by 996 days.

(21) Appl. No.: 12/026,921

(22) Filed: Feb. 6, 2008

(65) Prior Publication Data

US 2008/0219541 A1 Sep. 11, 2008

Related U.S. Application Data

(60) Provisional application No. 60/893,304, filed on Mar. 6, 2007.

(51) Int. Cl.
*G06K 9/54* (2006.01)

(52) U.S. Cl. .......................... 382/304; 345/603; 348/441

(58) Field of Classification Search .................. 345/603; 348/441, 469, 555; 382/304; 386/232; 700/1; 707/E17.006; 708/204
See application file for complete search history.

(56) References Cited

U.S. PATENT DOCUMENTS

| | | | |
|---|---|---|---|
| 6,128,670 A * | 10/2000 | Hashimoto et al. ............... 710/1 |
| 6,282,462 B1 | 8/2001 | Hopkins | |
| 6,781,606 B2 | 8/2004 | Jouppi | |
| 2002/0051216 A1* | 5/2002 | Hudson et al. ................. 358/302 |
| 2002/0093537 A1* | 7/2002 | Bocioned et al. ............. 345/777 |
| 2002/0094119 A1 | 7/2002 | Sahadevan | |
| 2002/0156650 A1* | 10/2002 | Klein et al. ........................ 705/2 |
| 2002/0163676 A1* | 11/2002 | Jones et al. .................... 358/505 |
| 2003/0038807 A1* | 2/2003 | Demos et al. .................. 345/473 |
| 2003/0040820 A1* | 2/2003 | Staver et al. ..................... 700/86 |
| 2004/0075821 A1 | 4/2004 | Silverbrook | |
| 2004/0107407 A1* | 6/2004 | Henson et al. .................... 716/1 |
| 2004/0201693 A1 | 10/2004 | Endo | |
| 2006/0132827 A1 | 6/2006 | Schanding | |

* cited by examiner

*Primary Examiner* — Gregory F Cunningham

(74) *Attorney, Agent, or Firm* — George R. McGuire; David B. Woycechowsky; Bond Schoeneck & King

(57) ABSTRACT

The present invention provides a plurality of interchangeable modules each of which is adapted to interface with at least one image receptor having predetermined physical interface parameters, including means for receiving image data from the at least one image receptor, processing means for converting the received image data into a converted, common format, and bus means for adapting to and communicating with a mother board. The interchangeable modules can be embodied in a plurality of daughter boards that are adapted for electrical connection to a mother board. Each daughter board can include the physical interface corresponding with the image receptor for which it has been programmed to receive data, with the physical interface being adapted for extending outwardly from a cabinet enclosing the daughter board and the mother board.

6 Claims, 3 Drawing Sheets

UNIVERSAL INTERFACE FOR MEDICAL IMAGING RECEPTORS

CLAIM OF PRIORITY

The present application claims priority to U.S. provisional patent application No. 60/893,304, filed Mar. 6, 2007, and to U.S. patent application Ser. No. 11/924,968 filed Oct. 26, 2007, the entireties of which is incorporated herein by reference in its entirety.

BACKGROUND OF THE INVENTION

The present invention relates generally to systems for capturing and processing digital image data from commercially available image receptors, and more specifically to such systems that are adapted to interface with a plurality of image receptors that have different interface parameters.

Image receptors used in the medical imaging industry include, for example, CCD cameras, and flat panel detectors (FPDs). Generally, a radiation source directs emitted radiation that is partially passed through, and partially absorbed by, a subject. The image receptor records an image based upon the amount of absorbed radiation (which can be inferred from the amount that is passed by the subject such that it reaches the image receptor). The data generated by these image receptors (that is, the "output data") is sent via a predetermined protocol to a data processing module (sometimes herein referred to as an "image processor" or "image data processing unit") which is programmed to receive formatted data in a predetermined format. The data processing module processes the output data to produce processed data. The processed data can then be communicated to a display unit, such as a CRT. The processed data can, additionally or alternatively, be stored in memory for archiving and subsequent retrieval and viewing.

Each of the various types and even different versions of the same type of image receptors has a unique interface. For purposes of this document, a "type" of image receptor will refer to any group of image receptors that share the same predetermined format and predetermined interface parameters with respect to the output data, regardless of the hardware and/or software used to receive the radiation and convert that information into corresponding output data.

Conventional image data processing modules are designed to receive and convert output data from a single type of image receptor. In other words, conventional image data processing modules can only handle output data provided in a single predetermined format with predetermined parameters, and cannot handle output data in multiple formats and/or with multiple sets of parameters. Therefore, if an imaging center uses two or more different types of receptors, then a separate data processing module will be required to interface with each receptor type.

SUMMARY OF THE INVENTION

According to the present invention, an image processor is constructed and/or programmed to have the ability to interface with a variety of types of image receptors. According to the present invention, an image processor is constructed and/or programmed to have the ability to handle image receptor output data in two or more different formats and/or having two or more different sets of associated parameters. Different types of receptors have advantageous features for different examinations. To give some examples of this: (i) some types of receptors are used only for static radiographic exposures; (ii) other types of receptors are used for the dynamic fluoroscopic applications; (iii) other types of receptors show better results for cardiac studies; and (iv) other types of receptors are better for the chest exams.

It is therefore an object and advantage of the present invention to provide an image data processing unit adapted to interface with two or more types of image receptors, each type having unique interface parameters.

It is another object and advantage of the present invention to provide an image data processing unit that is adaptable to being used with a variety of types of image receptors each having predetermined interface parameters.

It is still a further object and advantage of the preset invention to provide interchangeable image modules for interfacing with a variety of types of image receptors, each of which has predetermined interface parameters.

It is yet an additional object and advantage of the present invention to provide a method for interfacing with a variety of types of image receptors, each of which includes a predetermined interface format.

It is another object and advantage of the present invention to provide the ability to interface to a plurality of various types of receptors in order to service different examination rooms and/or different diagnostic modalities with a single imaging data processing system equipped with a universal, multi-sensor interface.

At least some embodiments of the present invention include both an x-ray based image receptor and a visible light based image receptor.

At least some embodiments of the present invention include both a static image receptor and a dynamic image receptor.

At least some embodiments of the present invention include both an image receptor suitable for cardiac imaging and an image receptor suitable for orthopedic imaging.

Other objects and advantages of the present invention will be understood from the following discussion.

According to one aspect of the present invention, an image data processing system includes generic image data processing circuitry, generic format conversion circuitry and a bus. The generic image data processing circuitry is adapted to receive image data in a generic format, to process the generic format image data and to send commands in a generic command format. The generic format conversion circuitry is adapted to receive image receptor output data, to convert the image receptor output data into generic format image data, to send generic format image data to the generic image data processing circuitry, to receive generic format commands from the generic image data processing circuitry and to convert the generic format commands into image receptor commands. The bus is adapted to receive image receptor output data, to send the image receptor output data to the generic format conversion circuitry, to receive image receptor commands from the generic format conversion circuitry. The image receptor output data may be any type of a plurality of types of image receptor output data. The image receptor commands may be any type of a plurality of types of image receptor commands.

According to another aspect of the present invention, an image data processing system includes generic image data processing circuitry, generic format conversion circuitry, a bus, and a plurality of interchangeable modules. The generic image data processing circuitry is adapted to receive image data in a generic format, to process the generic format image data and to send commands in a generic command format. The generic format conversion circuitry is adapted to receive image receptor output data, to convert the image receptor output data into generic format image data, to send generic format image data to the generic image data processing circuitry, to receive generic format commands from the generic image data processing circuitry, and to convert the generic format commands into image receptor commands. The bus is adapted to receive image receptor output data, to send the image receptor output data to the generic format conversion circuitry, and to receive image receptor commands from the generic format conversion circuitry. Each interchangeable module is adapted to receive image receptor commands from said bus, to send the image receptor commands to a respective external image receptor, to receive the image receptor output data from its corresponding external image receptor, and to send the image receptor data to the bus. The plurality of external image receptors includes more than one type of image receptor. The image receptor output data includes more than one type of image receptor output data. The image receptor commands include more than one type of image receptor commands.

According to another aspect of the present invention, an image data receiving and processing system includes generic image data processing circuitry, generic format conversion circuitry, a bus/interface assembly and a plurality of image receptors. The generic image data processing circuitry is adapted to receive image data in a generic format, to process the generic format image data and to send commands in a generic command format. The generic format conversion circuitry is adapted to receive image receptor output data, to convert the image receptor output data into generic format image data, to send generic format image data to the generic image data processing circuitry, to receive generic format commands from the generic image data processing circuitry, and to convert the generic format commands into image receptor commands. The bus/interface assembly is adapted to receive image receptor output data, to send the image receptor output data to the generic format conversion circuitry, and to receive image receptor commands from the generic format conversion circuitry. Each image receptor interface is designed to receive image receptor commands from the bus/interface assembly, to generate image receptor output data in response to the image receptor commands and to radiation received from an external source, and to send the image receptor output data the bus/interface assembly. The plurality of image receptors includes more than one type of image receptor.

BRIEF DESCRIPTION OF THE DRAWINGS

The present invention will be more fully understood and appreciated by reading the following detailed description in conjunction with the accompanying drawings, in which.

DETAILED DESCRIPTION

Figure 3:
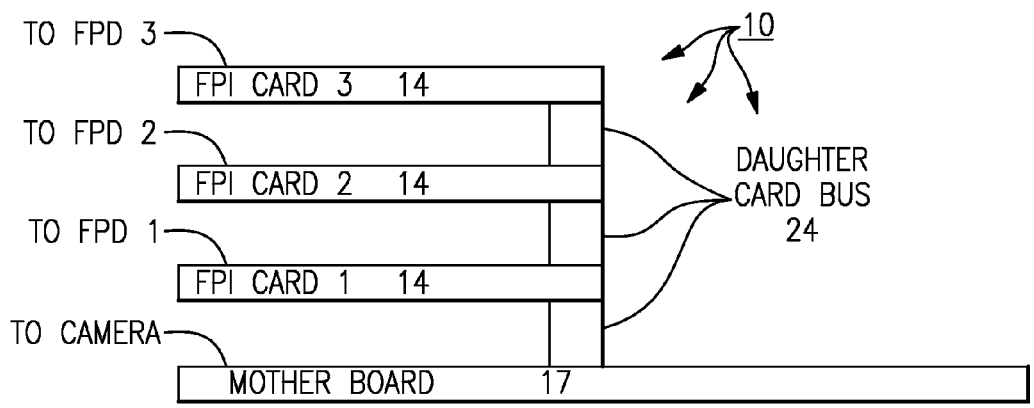
FIG. 3 is a side view of the embodiment of the imaging system shown in FIG. 1.
Figure 4:
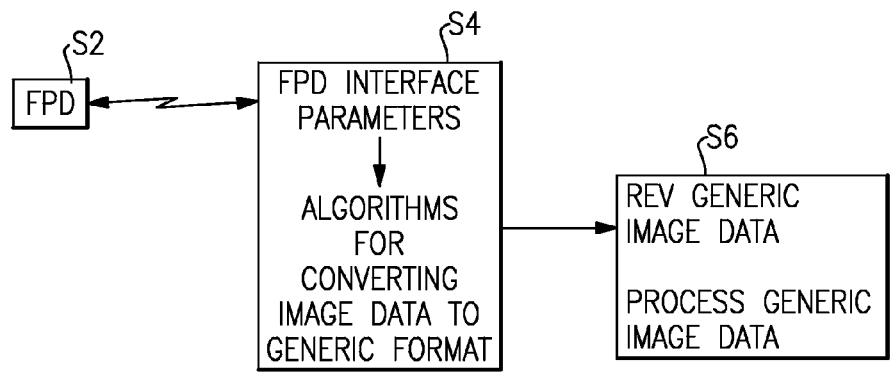
FIG. 4 is a high level flow chart of the present invention.

In accordance with the foregoing objects and advantages, the present invention provides a system, designated generally by reference numeral 10, for processing image receptor output data received from any one of a plurality of types of image receptors, such as FPDs 12 (see FIGS. 3 and 4). It should be understood that embodiments of the present invention (for example, system 10, or as another example, embodiments developed in the future with later-developed technology) can be used in combination with different types of image receptors, such as the Thin Film Transistor FPDs, CMOS technology FPDs, CCD cameras, and other types of digital image receptors (now known or to be developed in the future).

Figure 1:
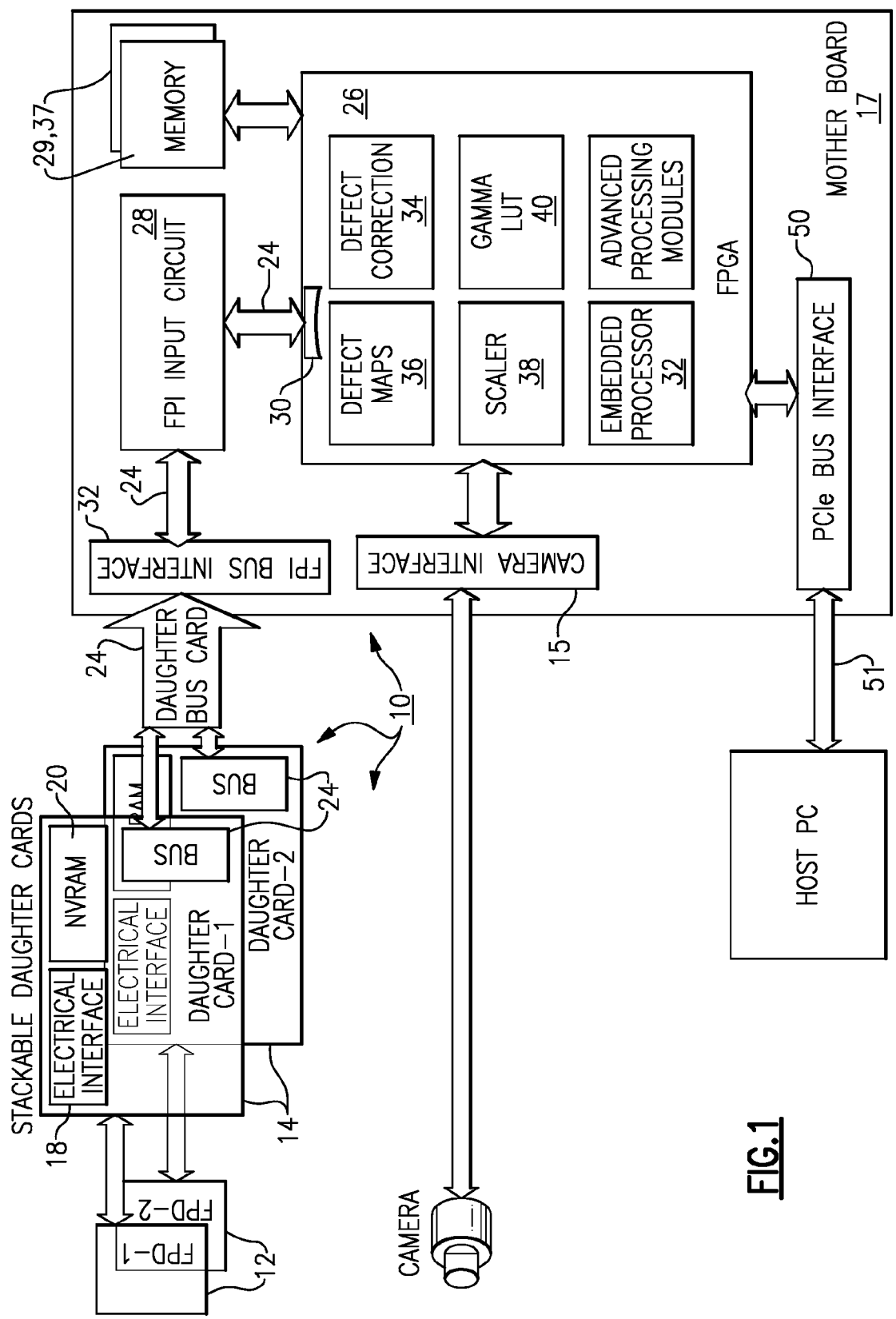
FIG. 1 is a schematic of an assembly including a host computer, a camera and an embodiment of an imaging system according to the present invention.

With reference to FIG. 1, exemplary imaging system 10 generally includes a mother board 17 and a set of stackable daughter boards 12. This physical arrangement of a mother board and stackable daughter boards is considered advantageous and represents the preferred physical arrangement for imaging systems according to the present invention. However, it is noted that the circuitry of the present invention could be distributed over a larger or small number of substrates (e.g., boards), could have a different spatial arrangement of substrates, could have different forms of physical constraint between or among substrates, and is not even generally limited to substrate implemented electronics at all. As shown in FIG. 1, a plurality of daughter cards (or FPI cards) 14 that are stacked on motherboard 17. Each daughter card 14 will include an interface 18 that is specific to a particular type of receptor 12. For example, in the schematic of FIG. 3, the three stacked daughter boards 14 are respectively interfaced to different FPDs: (i) FPD1; (ii) FPD2; and (iii) FPD3. In addition, each daughter card 14 includes a memory 20, such as a non-volatile random access memory ("RAM"). Each daughter board 14 is configured to both request and receive image receptor output data from the receptor 12 to which it is interfaced, as is shown at step S2 in FIG. 4. Interfaces 18 are preferably configured to extend outside of a cabinet (not shown) that houses the components of system 10. It should be noted that an interface 18 might be as simple, electronically speaking, as a passive cross bridge between individual sensor and a standard bus. The interface must have the appropriate hardware configuration to connect to the particular type of receptor to which its daughter card is designed to connect.

Some or all of the daughter boards 14 may include initial image data correction circuitry (not shown), such as FPGA (field programmable gate array) circuitry, to provide initial image data corrections. Additionally, such initial image data correction circuitry might be constructed to provide a simulation of receptor output data, test patterns for test of the system performance and/or test patterns for adjustment of the system. Initial image data correction circuitry on the daughter card is preferred for daughter cards designed to interface with x-ray based receptors (for example, FPD x-ray receptors) because the only way to obtain digital image data from an x-ray based receptor is to irradiate the x-ray based receptor by x-ray radiation. On the other hand, camera based receptors can provide image output based on the visible light spectrum, which reduces the need for initial image data correction circuitry to be located on the daughter card. Any initial image correction circuitry that may be present on some or all of the daughter cards would supplement image correction circuitry 26 on the mother board 17, which will now be discussed.

In the preferred physical arrangement shown in FIGS. 1 and 3, each daughter card 14 communicates to the mother board over a bus 24. The bus 24 includes an FPI input circuit 28 and an FPI bus interface 32. More specifically, signals are communicated through the bus 24 between the daughter cards an FPGA (or image correction circuitry) 26. Although the FPGA 26 is shown in Figure one as a single block 26, the image correction functionality may be distributed over multiple circuitry components, multiple functional blocks, multiple FPGAs or even multiple substrates. FPGA 26 includes an input frame buffer 30 that receives image receptor output data from bus interface 28. The input frame buffer also interfaces with a memory 29, such as a double data rate RAM (DDR RAM). FPGA 26 further includes an embedded processor 32 that synchs with bus interface 28. FPGA 26 further includes a series of support functions. The series of support functions of FPGA 26 include defect correction algorithms 34. The defect correction algorithms receive image data from frame buffer 30 and defect data from defect maps 36. The defect maps, in turn, receives their data from a memory, such as a DDR RAM 37. The series of support functions of FPGA 26 further include a scaler 38 that scales image data received from defect correction algorithms 34. The series of support functions of FPGA 26 further include a Gamma look up table (LUT) 40, if needed. Additional advanced image processing modules 39 could be incorporated as necessary and/or desirable. For example, these modules could include the following types of image processing algorithms: Region Of Interest (ROI) detection, Image Stitching, Tomography Synthesis, 3-D reconstructions, etc.

The series of support functions of FPGA 26 all combine to convert the image receptor output data into generic format data, having a generic format, regardless of which receptor 12 originated the data. The data processing relating to FPD interface parameters and algorithms for converting image receptor output data into generic format data is shown at step S4 in FIG. 4.

In this preferred embodiment, FPGA sends generic image data out through PCIe bus interface 50 to the host computer. The computer would be programmed to include generic image data processing circuitry to further process the image in its generic format, and to perform tasks such as display of the image on a display for medical purposes. Importantly, because the host computer gets the image data in a generic format, it does not matter that the data may have originally come from any of a number of different image receptors having different types. System 10 of the present invention is a sort of translator that can take at least a couple of different types of image receptor data and translate it into a form that the host computer can deal with.

Alternatively, other types of circuitry can receive the generic image data, such as low voltage differential signaling (LVDS) transmitters, LVDS interfaces, and LVDS receivers. Other data transmission standards could also be used. In some embodiments of the present invention, further data processing of the generic format data may take place either within FPGA 26, between FPGA 26 and bus interface 50 and/or after the generic format data passes through bus interface 50 (for example, at the host computer shown in FIG. 1). This further processing of the generic format data is shown at step S6 of FIG. 4. Power and data communication are supplied to FPGA 26 using PCI express (or PCIe) bus interface 50.

In addition to stackable daughter cards 14, system 10 includes an interface to a receptor with a different kind of hardware, such as a fiber optic interface 15 for a camera (see FIGS. 1 and 3).

In essence, daughter cards 14 will convert commands from the image processor into the communications format required by receptors 12 depending on receptor type. The list of commands can be expanded as needed, and can include (but is not limited to), for example:

Initiate single image capture
Terminate single image capture
Read image from receptor and transfer to mother board
Start continuous capture with automatic image transfer
Set frame rate (e.g., 30 fps, 15 fps, 10 fps, etc.)
Select readout region and resolution (with pixel binning)
Set panel sensitivity
Enable or disable low power standby mode
Diagnostics
Status LED indicators for each power supply
Power-on diagnostics with pass-fail LED indicator
Mode LED indicators
Internal test pattern generator
Remote diagnostics for receptors and other components
Remote download of firmware for FPGA and microprocessor
Read status and error messages
Start defect map calibration procedure
Read or write pixel defect map
Set Gamma look up table
Anti-vignetting coefficients (e.g., to correct underexposure in corners)
Define field of view Defect correction will include stitching required for sub-panel mosaics like the Thales large format panel. The Thales panel is composed of two to four smaller panels with seams between them that need to be filled in. The defect maps 36 are stored in non-volatile memory on each daughter board 14, and are calculated in the host and downloaded through the system to the non-volatile memory 20.

The raw image receptor output data from receptors 12 will be converted into a format selected by the host. The output image format can be a sub-region of the original image, and may include pixel binning to reduce resolution. The bit depth will also be adjusted as selected by the host. If necessary, typical 16-bit or 14-bit depth of an original image will be converted to 10-bit or 12-bit using look up table 40.

Figure 2A:
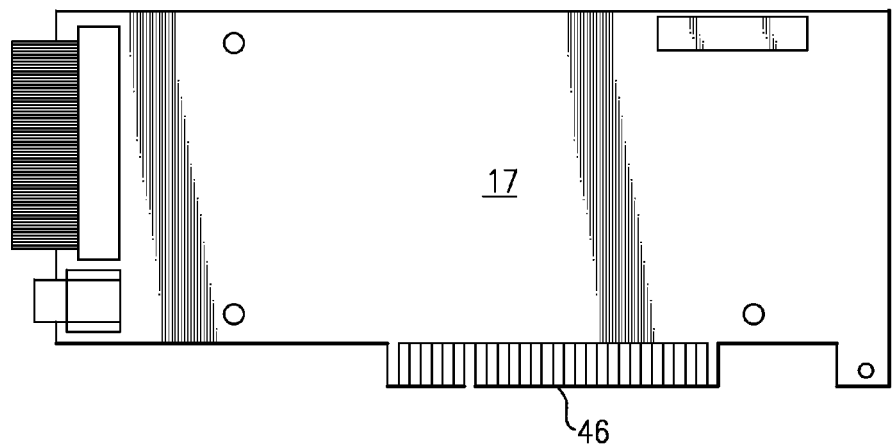
FIG. 2A is a top view of a first variation of a mother board according to the present invention.

With reference to FIG. 2A, the outward physical appearance of a first variation of the mother board 17 is illustrated. This variation provides a second interface that does not need conversion, such as the fiber optic interface for a camera. Daughter boards (sometimes also referred to as daughter cards) can be mounted transversely across the mother board 17, and a PCIe bus 51 (see FIG. 1) is provided to interface with host PC and to supply power to the daughter cards 14.

Figure 2B:
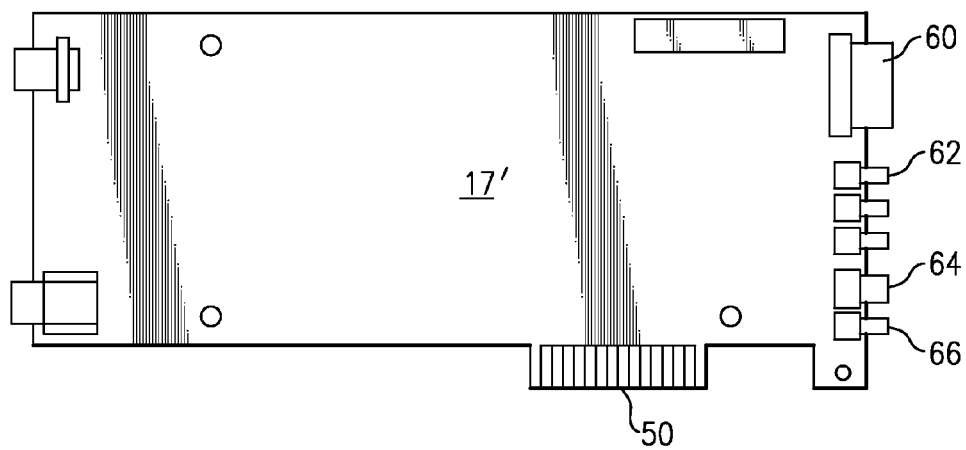
FIG. 2B is a top view of a second variation of a mother board according to the present invention.

With reference to FIG. 2B, the outward physical appearance of a second variation of the mother board 17 is illustrated. In this second variation, mother board 17 includes a predetermined video interface, such as an RJ45, as well as a fiber optic interface. Daughter cards 14 can be connected transversely across board 17 and in stacked relation to one another. A PCIe 50 interface is provided, as are digital video interface 60 for receiving digital video data, and a DVI-I interface 62 to output either digital or analog video. Also, S-video and NTSC/PAL interfaces 64, 66 are provided.

What is claimed is:

1. An image data processing system for use with a Plurlity of external receptors, with each receptor having an associated receptor-specific command format and receptor-specific image data format, the s system comprising:
a host computer;
a first bus;
a mother board;
a second bus; and
a plurality of daughter boards;
wherein;
the host computer comprises common image data processing circuitry adapted to: (i) receive common image data sets in a common image format, (ii) process the common format image data sets, and (iii) send common format commands in a common command format;

the mother board comprises common format conversion circuitry adapted to: (i) receive image receptor output data sets respectively in various receptor-specific formats, (ii) respectively convert the image receptor output data sets into common format image data sets in a common format, (iii) send the common format image data sets to the common image data processing circuitry through the first bus, (iv) receive the common format commands from the common image data processing circuitry through the first bus, and (v) respectively convert the common format commands into receptor-specific commands in one of a plurality of receptor-specific command formats depending upon an identity of an image receptor which will perform the command;

the second bus is adapted to: (i) receive the image receptor output data sets from the plurality of daughter boards, (ii) the image receptor output data sets to said common format conversion cicuitry, (iii) receive the receptor-specific commands from the common format conversion circuitry, and (iv) send the receptor specific commands to the plurality of daughter boards; and each daughther board of the pluraltiy of daughter boards adapted to: (i) receive receptor-specific commands from the second bus, (ii) send receptor-specific commands to a respective external image receptor, (iii) receive the image receptor output data from its corresponding external image receptor, and (iv) send the image receptor data sets to the second bus.

2. The system of claim 1 wherein:
the plurality of daughter boards includes a first daughter board and a second daughter board;
the first and second daughter boards are respectivly adapted to interface one of the following types of external image receptors:
a first receptor type used only for static radiographic exposures;
a second receptor type used for dynamic fluoroscopic applications;
a third receptor type used for cardiac studies; and
a fourth receptor type used for chest exams.

3. The system of claim 1 wherein:
the plurality of daughter boards includes a first daughter board and a second daughter board;
the first daughter board is adapted to interface with a radiographic image receptor; and
the second daughter board is adapted to interface with a fluoroscopic receptor.

4. The system of claim 1 wherein:
the plurality daughter boards includes a first daughter board and a second daughter board;
the first daughter board is adapted to interface with a first receptor type having a first set of parameters; and
the second daughter board is adapted to interface with a second receptor type having a second set of predetermined interface parameters.

5. The system of claim 1 wherein:
the plurality, of daughter boards includes a first daughter board and a second daughter board;
the first daughter board is adapted to interface with a first receptor type having a first interface format; and
the second daughter board is adapted to interface with a second receptor type having a second interface format.

6. An image data processing system for use with a plurality of external receptors, with each receptor having an associated receptor-specific command format and receptor-specific image data format, the system comprising:
a host computer;
a first bus;
a mother board;
a second bus; and
a plurality of daughter boards;
wherein:
the host computer comprises common image data processing circuitry adapted to: (i) receive common image data sets in a common image format, (ii) process the common format image data sets, and (iii) send common format commands in a common command format;
the mother board comprises common format conversion circuitry adapted to: (i) receive image receptor output data sets respectively in various receptor-specific formats, (ii) respectively convert the image receptor output data sets into common format image data sets in a common format, (iii) send the common format image data sets to the common image data processing circuitry through the first bus, (iv) receive the common format commands from the common image data processing circuitry through the first bus, and (v) respectively convert the common format commands into receptor-specific commands in one of a plurality of receptor-specific command formats depending upon an identity of an image receptor which will perform the command;
the second bus is adapted to: (i) receive the image receptor output data sets from the plurality of daughter boards, (ii) send the image receptor output data sets to said common format conversion circuitry, (iii) receive the receptor-specific commands from the common format conversion circuitry, and (iv) send the receptor-specific commands to the plurality of daughter boards;
each daughter board of the plurality of daughter boards is adapted to: (i) receive receptor-specific commands from the second bus, (ii) send receptor-specific commands to a respective external image receptor, (iii) receive the image receptor output data from its corresponding external image receptor, and (iv) send the image receptor data sets to the second bus;
the mother board comprises mother board stacking hardware;
each daughter board of the plurality of daughter boards comprises daughter board stacking hardware; and
the mother board stacking hardware, the daughter board stacking hardware and the bus are mechanically and electrically connectable so that the plurality of daughter boards can be interchangeably stacked on the mother board and electrically connected to it through the second bus.

* * * * *

UNITED STATES PATENT AND TRADEMARK OFFICE
CERTIFICATE OF CORRECTION

| | |
|---|---|
| PATENT NO. | : 8,116,595 B2 |
| APPLICATION NO. | : 12/026921 |
| DATED | : February 14, 2012 |
| INVENTOR(S) | : Richard Hopkins and Oscar Khutoryansky |

It is certified that error appears in the above-identified patent and that said Letters Patent is hereby corrected as shown below:

Column 6, claim 1, line 56, after "the" please delete the letter "s";
Column 7, claim 1, line 17, after "(ii)" please add the word --send--;
Column 7, claim 4, line 49, after "plurality" please add the word --of--;

Signed and Sealed this
Twenty-ninth Day of May, 2012

David J. Kappos
*Director of the United States Patent and Trademark Office*